United States Patent
Chen et al.

(10) Patent No.: US 11,745,656 B2
(45) Date of Patent: Sep. 5, 2023

(54) NOTIFICATION CONTROL APPARATUS FOR VEHICLE

(71) Applicant: TOYOTA JIDOSHA KABUSHIKI KAISHA, Toyota (JP)

(72) Inventors: Xi Chen, Nagoya (JP); Tsunekazu Yasoshima, Nagoya (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 0 days.

(21) Appl. No.: 17/878,335

(22) Filed: Aug. 1, 2022

(65) Prior Publication Data

US 2023/0042903 A1 Feb. 9, 2023

(30) Foreign Application Priority Data

Aug. 6, 2021 (JP) ................. 2021-129711

(51) Int. Cl.
*B60Q 9/00* (2006.01)
*G07C 5/02* (2006.01)

(52) U.S. Cl.
CPC ............... *B60Q 9/008* (2013.01); *G07C 5/02* (2013.01)

(58) Field of Classification Search
None
See application file for complete search history.

(56) References Cited

U.S. PATENT DOCUMENTS

| | | | |
|---|---|---|---|
| 9,105,190 B2* | 8/2015 | Akiyama | B60W 10/20 |
| 9,393,960 B2 | 7/2016 | Kodaira | |
| 9,483,945 B2 | 11/2016 | Okita et al. | |
| 9,873,412 B2 | 1/2018 | Moriizumi | |
| 10,766,416 B2* | 9/2020 | Yoshihara | B60W 50/0097 |
| 10,793,147 B2 | 10/2020 | Kaminade et al. | |
| 11,110,859 B2* | 9/2021 | Morotomi | B60Q 9/00 |
| 2014/0091920 A1* | 4/2014 | Thompson | B60Q 1/38 340/475 |
| 2017/0232893 A1* | 8/2017 | Ebner | B60D 1/62 340/431 |
| 2017/0305422 A1* | 10/2017 | Ito | B60W 30/16 |

(Continued)

FOREIGN PATENT DOCUMENTS

| | | |
|---|---|---|
| JP | 2004-280453 A | 10/2004 |
| JP | 2018-156253 A | 10/2018 |
| JP | 2021-117637 A | 8/2021 |

*Primary Examiner* — Muhammad Adnan
(74) *Attorney, Agent, or Firm* — Sughrue Mion, PLLC

(57) ABSTRACT

Provided is a notification control apparatus for a vehicle configured to determine, based on surrounding information and an operation state of an operation unit, whether there exists a possibility that an own vehicle turns toward a specific direction while an oncoming vehicle is approaching, to determine, when affirmative determination is made, based on vehicle information including at least one of a steering input value or presence/absence of a brake operation and a vehicle speed, whether a possibility that the own vehicle completes crossing of an opposing lane or an intersection after elapse of a reference period is high, and when affirmative determination is made, to execute the notification control when a virtual passing period required for the own vehicle to virtually pass the oncoming vehicle is a lower limit period or longer and an upper limit period or shorter, the upper limit period being the reference period or shorter.

4 Claims, 12 Drawing Sheets

(56) References Cited

U.S. PATENT DOCUMENTS

| | | | |
|---|---|---|---|
| 2017/0351926 A1* | 12/2017 | Nagase | B60W 30/18145 |
| 2018/0247538 A1* | 8/2018 | Baek | B60W 30/0953 |
| 2018/0268696 A1* | 9/2018 | Morotomi | B60W 30/18163 |
| 2018/0268702 A1* | 9/2018 | Morotomi | G08G 1/166 |
| 2018/0326979 A1* | 11/2018 | Tsuruoka | B60W 30/0956 |
| 2018/0345960 A1* | 12/2018 | Fujii | B60W 30/18163 |
| 2019/0064829 A1* | 2/2019 | Ozawa | B60W 10/184 |
| 2019/0073903 A1* | 3/2019 | Baba | B60W 30/09 |
| 2019/0291730 A1* | 9/2019 | Kamiya | G06V 20/58 |
| 2020/0307573 A1* | 10/2020 | Kato | B60W 60/0027 |
| 2020/0331466 A1* | 10/2020 | Ohmura | B60W 30/18159 |
| 2020/0339079 A1* | 10/2020 | Ohmura | B60W 30/18159 |
| 2020/0339080 A1* | 10/2020 | Ohmura | B60W 30/0953 |
| 2020/0361455 A1* | 11/2020 | Murakami | G06V 20/588 |
| 2020/0391733 A1* | 12/2020 | Kumagai | B60T 7/22 |
| 2021/0061309 A1* | 3/2021 | Kawanai | B60W 60/0011 |
| 2021/0107521 A1 | 4/2021 | Fujita et al. | |
| 2021/0107528 A1 | 5/2021 | Fujita et al. | |
| 2021/0146956 A1 | 5/2021 | Fujita et al. | |
| 2021/0146958 A1 | 5/2021 | Tanaka et al. | |
| 2021/0229600 A1 | 7/2021 | Morotomi et al. | |
| 2022/0027644 A1* | 1/2022 | Gali | G06T 7/73 |

* cited by examiner

NOTIFICATION CONTROL APPARATUS FOR VEHICLE

BACKGROUND OF THE INVENTION

1. Field of the Invention

The present invention relates to a notification control apparatus for a vehicle for notifying, when a possibility of collision of an own vehicle with an oncoming vehicle during a turn of the own vehicle exists, a driver of the own vehicle of existence of the oncoming vehicle.

2. Description of the Related Art

Hitherto, there has been known an apparatus (hereinafter referred to as "related-art apparatus") which executes, when another vehicle that an own vehicle may collide with is detected, collision avoidance control which avoids collision with the another vehicle or mitigates impact caused by the collision. The collision avoidance control includes, for example, warning control of issuing warning to a driver of the own vehicle and autonomous brake control of automatically applying a braking force to the own vehicle. "The possibility of collision of the own vehicle with another vehicle" is hereinafter also referred to as "collision possibility."

The related-art apparatus determines the presence or absence of the collision possibility based on a predicted trajectory of the own vehicle and a predicted trajectory of the another vehicle. Specifically, the related-art apparatus calculates a turning radius of the own vehicle based on a speed and a yaw rate of the own vehicle, calculates the predicted trajectory of the own vehicle based on the turning radius, and calculates the predicted trajectory of the another vehicle based on a transition of a position of the another vehicle. The related-art apparatus determines, in a case in which the predicted trajectories of both of the vehicles intersect with each other, whether or not both of the vehicles collide with each other (that is, whether or not timings at which the own vehicle and the another vehicle arrive at an intersection of the two predicted trajectories are substantially the same) when it is assumed that the own vehicle and the another vehicle move while maintaining current moving states. When the related-art apparatus determines that the own vehicle collides with the another vehicle (that is, the timings at which the own vehicle and the another vehicle arrive at the intersection are substantially the same), the related-art apparatus calculates a time to collision (TTC) being a period predicted to be required for the own vehicle to collide with the another vehicle (that is, a period required for the own vehicle to reach the intersection). When the TTC is equal to or shorter than a predetermined TTC threshold value, the related-art apparatus determines that the collision possibility exists, and thus executes the collision avoidance control.

In more detail, the collision avoidance control is executed on two stages. That is, when the TTC becomes equal to or shorter than a predetermined first TTC threshold value, the related-art apparatus first executes the warning control. After that, when the TTC continues to decrease and becomes equal to or shorter than a second TTC threshold value (value shorter than the first TTC threshold value) even after the warning control is executed, the related-art apparatus executes the autonomous brake control. With this configuration, it is considered that a possibility that the driver can recognize the existence of the another vehicle is increased as a result of the warning control, and hence the driver can execute a driving operation for avoiding the collision with the another vehicle, with the result that a frequency of the execution of the autonomous brake control can be reduced.

Such collision avoidance control over the two stages may appropriately be executed during a period in which the own vehicle is moving straight. However, when the own vehicle turns right, a possibility that the collision avoidance control is not appropriately executed is high.

That is, as described above, the related-art apparatus determines the presence or absence of the collision possibility while assuming that the predicted trajectories of the own vehicle and the another vehicle intersect with each other, and thus does not determine the presence or absence of the collision possibility in the first place when the predicted trajectories of both of the vehicles do not intersect with each other. When the own vehicle turns right, the driver executes a rightward steering operation on a steering wheel. For a while after the right turn starts (hereinafter also referred to as "first period"), the yaw rate is low, and a turning radius thus becomes larger. As a result, the predicted trajectory in the first period has a shape corresponding to a large turn (shape small in curvature) compared with an actual trajectory during the right turn. Consequently, during the first period, the predicted trajectory of the own vehicle tends to extend to a rear region of the another vehicle (typically, an oncoming vehicle), and is less likely to intersect with the predicted trajectory of the another vehicle. Accordingly, the processing of determining the presence or absence of the collision possibility is less likely to be executed during the first period. The "another vehicle" is hereinafter referred to as "oncoming vehicle" in description relating to the right turn.

After that, when the yaw rate increases and the turning radius thus gradually decreases, the predicted trajectory of the own vehicle comes to intersect with the predicted trajectory of the oncoming vehicle, and hence the determination processing for the presence or absence of the collision possibility comes to be executed. However, the own vehicle has already turned to a certain extent at this time point, and hence even when an oncoming vehicle having the collision possibility is determined to exist, a possibility that the TTC has already become shorter than the first TTC threshold value to become equal to or shorter than the second TTC threshold value is high. In other words, a possibility that the warning control and the autonomous brake control are simultaneously executed is high. Accordingly, when the own vehicle turns right, a possibility that the collision avoidance control is not appropriately executed over the two stages is high, and the driver cannot consequently execute the driving operation for avoiding the collision with the oncoming vehicle based on the warning control.

Accordingly, there has been investigated a technology capable of executing "control of notifying the driver of the existence of the oncoming vehicle (hereinafter referred to as 'notification control')" at a timing earlier than the autonomous brake control also when turning right. For example, in Japanese Patent Application Laid-open No. 2004-280453, there is described a technology relating to a safety checking system for a right turn of a vehicle, which assists a driver in a safety checking operation during a right turn. Specifically, the system includes oncoming vehicle state detection means for detecting a state of an oncoming vehicle existing on an opposing lane, and collision possibility determination means for determining a collision possibility during a right turn based on the state of the oncoming vehicle when an own vehicle is stopped and a right direction indicator is turned on. Moreover, when the own vehicle is stopped under a state in which the right direction indicator is turned on (for example, the own vehicle is stopped at a right turn stop line of an intersection), the collision possibility determination means determines whether or not there exists the collision possibility during the right turn based on the state of the oncoming vehicle, and when having determined that the collision possibility exists, the system is configured to issue a warning to the driver.

The system as described in Japanese Patent Application Laid-open No. 2004-280453 is a technology dedicated for issuing the warning to the driver at the timing earlier than the autonomous brake control when the own vehicle is stopped, but regardless of whether or not the own vehicle is stopped, there is a possibility that an unnecessary operation occurs when the notification control is executed at a timing earlier than the autonomous brake control. That is, whether or not the notification control is to be executed is determined at a relatively early stage in a process of the right turn, and hence it is difficult to accurately determine the presence or absence of the collision possibility. As a result, there is a possibility that unnecessary notification control is executed for an oncoming vehicle having an extremely low collision possibility in actuality.

"An oncoming vehicle having an extremely low collision possibility in actuality" is, for example, an oncoming vehicle moving at a relatively far position as viewed from the own vehicle or an oncoming vehicle passing a close position of the own vehicle (without colliding with the own vehicle) as a result of the own vehicle moving at low speed or temporarily stopping in the future in the process of the right turn of the own vehicle. The unnecessary operation of the notification control may annoy occupants of the own vehicle, and hence it is desired to develop a technology capable of suppressing such an unnecessary operation.

The above-mentioned problem may occur in a county in which left-hand traffic is required (a county that employs a lane layout in which an opposing lane is positioned on the right side with respect to a travel lane). There is given description that a similar problem may occur in a county in which right-hand traffic is required (a country that employs a lane layout in which an opposing lane is positioned on the left side with respect to the travel lane) when "right" in the description given above is read as "left."

SUMMARY OF THE INVENTION

The present invention has been made in order to solve the above-mentioned problem. That is, one object of the present invention is to provide a notification control apparatus for a vehicle which is capable of, during a turn, simultaneously achieving execution of notification control at a timing earlier than autonomous brake control and suppression of an unnecessary operation of the notification control. "During a turn" means "during a right turn" in a country in which left-hand traffic is required and means "during a left turn" in a country in which right-hand traffic is required.

According to at least one embodiment of the present invention, there is provided a notification control apparatus for a vehicle (hereinafter referred to as "the apparatus of the present invention"), the notification control apparatus including: a surrounding information acquisition device (11) configured to acquire, as surrounding information, information on a 3D object that exists forward of an own vehicle (V), and dividing lines that define a lane that extends forward of the own vehicle; a direction indicator switch (12) configured to detect an operation state of an operation unit (WL) to be operated by a driver of the own vehicle in order to operate direction indicators; a vehicle speed detection device (13) configured to detect a vehicle speed (v) of the own vehicle; a driving operation state detection device which includes at least one of a steering input value detection device (14) configured to detect a steering input value ($\theta$s) being an input value based on a steering operation by the driver or a brake switch (114) configured to detect presence or absence of a brake operation by the driver; a notification device (21, 22) configured to execute a notification operation; and a control unit (10) configured to control the notification device. In the notification control apparatus, the control unit is configured to: determine, in a case in which a direction in which an opposing lane is positioned with respect to a travel lane on which the own vehicle exists is defined as a specific direction, based on the surrounding information, whether an oncoming vehicle (Vop) exists (Step 610), the oncoming vehicle being another vehicle that moves on the opposing lane toward a direction approaching the own vehicle, and that a virtual extension (Lo) extending from the another vehicle along a moving direction of the another vehicle is passing on the specific direction side with respect to a current position of the own vehicle; determine, when a precondition which is satisfied when it is determined that the oncoming vehicle exists (Step 610: Yes) and that the operation unit is in an operation state corresponding to an operation to operate the direction indicator on the specific direction side (Step 620: Yes) is satisfied, based on vehicle information including at least one of the steering input value or the presence or absence of the brake operation and the vehicle speed, whether a crossing condition (condition 3, condition 5, and condition 6) is satisfied (Step 630, Step 830, Step 840), the crossing condition being satisfied when a possibility that the own vehicle completes, after elapse of a predetermined reference period (Tc, Ts), crossing of one of the opposing lane or an intersection with which the opposing lane merges is high; and cause the notification device to execute the notification operation, to thereby execute notification control of notifying the driver of the existence of the oncoming vehicle when an execution condition is satisfied in a case in which a direction opposite to the moving direction of the oncoming vehicle is defined as a longitudinal direction, the execution condition being satisfied when it is determined that the crossing condition is satisfied (Step 630: Yes, Step 830: Yes, Step 840: Yes) and that a virtual passing period (Tx) required for the own vehicle to virtually pass the oncoming vehicle in the longitudinal direction is equal to or longer than a predetermined lower limit period (Tl) and equal to or shorter than a predetermined upper limit period (Tu) equal to or shorter than the reference period (Step 640: Yes, Step 850: Yes) when it is assumed that the own vehicle moves in the longitudinal direction at a longitudinal speed (vy) being a component of the vehicle speed in the longitudinal direction and the oncoming vehicle moves while maintaining a current moving state.

In the apparatus of the present invention, when the crossing condition is satisfied and the virtual passing period is equal to or longer than the lower limit period and equal to or shorter than the upper limit period (period equal to or shorter than the reference period) under the state in which the precondition is satisfied, the execution condition is determined to be satisfied, and the notification control is executed. With this configuration, by setting the upper limit period to an appropriate period, "the crossing condition is satisfied and the virtual passing period is equal to or shorter than the upper limit period" means that "the own vehicle collides with the oncoming vehicle on the opposing lane or in the intersection when it is assumed that the own vehicle moves while maintaining the current longitudinal speed, and the oncoming vehicle moves while maintaining the current moving state." Moreover, by setting the lower limit period to an appropriate period, it is possible to prevent the notification control from being executed when the oncoming vehicle is so close that the driver can recognize the oncoming vehicle. Thus, according to the apparatus of the present invention, it is possible to appropriately determine, even without using the predicted trajectories, the collision possibility with the oncoming vehicle during the turn, and, consequently, it is possible to simultaneously achieve, during the turn, the execution of the notification control at a timing earlier than the autonomous brake control, and the suppression of the unnecessary operation of the notification control.

According to at least one aspect of the present invention, the driving operation state detection device is the steering input value detection device (14), the vehicle information is first vehicle information including a steering angle ($\theta$s), a steering angular velocity ($\omega$s), and the vehicle speed (v), and in a case in which a direction that is orthogonal to the longitudinal direction, and is directed to the specific direction is defined as a lateral direction, the control unit (10) is configured to: estimate, based on the first vehicle information, a moving distance (d) of the own vehicle at a time when it is assumed that the own vehicle (V) moves for a first reference period (Tc) which is included in the reference period; calculate a lateral moving distance (dy) being a component of the moving distance in the lateral direction; and determine that the crossing condition (condition 3) is satisfied when the lateral moving distance is equal to or longer than a predetermined distance threshold value (Dth) (Step 630: Yes).

With this configuration, by setting the first reference period and the distance threshold value to appropriate values, an accuracy of the execution condition can be increased. In other words, the unnecessary operation of the notification control can be suppressed.

In this case, the distance threshold value (Dth) is set to a value of an average lane width.

With this configuration, by setting the first reference period to an appropriate value, it is possible to increase "the possibility that the own vehicle completes the crossing of the opposing lane or the intersection when the own vehicle moves for the first reference period from the current position" in a case in which the crossing condition is satisfied. As a result, it is possible to increase the accuracy of the execution condition, and hence the unnecessary operation of the notification control can be suppressed.

According to at least one aspect of the present invention, the driving operation state detection device is the brake switch (114), the vehicle information is second vehicle information including the presence or absence of the brake operation, a deceleration, and the vehicle speed (v), and the control unit (10) is configured to: estimate, based on the second vehicle information, a stop required period (T) required for the own vehicle (V) to stop; and determine that the crossing condition (condition 5, condition 6) is satisfied when the vehicle speed is equal to or higher than a predetermined vehicle speed threshold value (vth), and the stop required period exceeds a second reference period (Ts) which is included in the reference period (Step 830: Yes, Step 840: Yes).

With this configuration, by setting the vehicle speed threshold value and the second reference period to appropriate values, the accuracy of the execution condition can be increased. In other words, the unnecessary operation of the notification control can be suppressed.

In the description above, in order to facilitate understanding of the invention, reference symbols used in embodiments of the present invention are enclosed in parentheses, and are assigned to each of constituent features of the invention corresponding to the embodiments. However, each of the constituent features of the invention is not limited to the embodiments prescribed by the reference symbols.

DESCRIPTION OF THE EMBODIMENTS

First Embodiment (Configuration)

Figure 1:
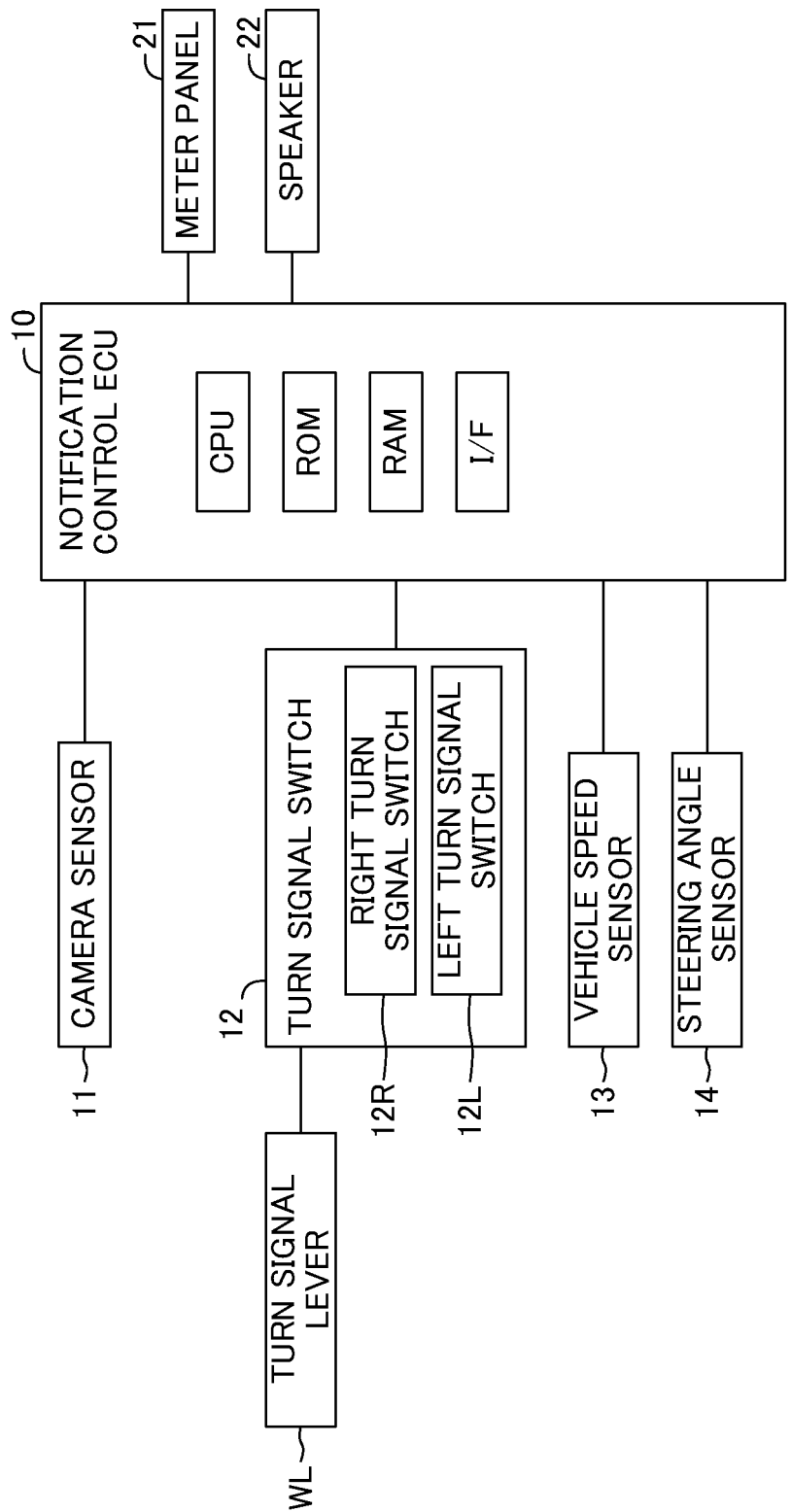
FIG. 1 is a schematic configuration diagram of a notification control apparatus for a vehicle according to a first embodiment (apparatus of the first embodiment) of the present invention.

Description is now given of a notification control apparatus for a vehicle according to a first embodiment (hereinafter also referred to as "apparatus of the first embodiment") of the present invention with reference to the drawings. As illustrated in FIG. 1, the apparatus of the first embodiment includes a notification control ECU 10, and a camera sensor 11, a turn signal switch 12, a vehicle speed sensor 13, a steering angle sensor 14, a meter panel 21, and a speaker 22, which are connected to the notification control ECU 10. The notification control ECU 10 includes a microcomputer as a principal component. The ECU is an abbreviation for "electronic control unit." The microcomputer includes, for example, a CPU, a ROM, a RAM, and an interface (I/F), and the CPU is configured to execute instructions (programs and routines) stored in the ROM to achieve various functions. A vehicle to which the apparatus of the first embodiment is mounted is hereinafter referred to as "own vehicle V" (this applies, in a second embodiment of the present invention described below, to a vehicle to which an apparatus of the second embodiment is mounted).

The notification control ECU 10 is configured to acquire information or signals output, detected, or generated by the sensors and switch 11 to 14 each time a predetermined period elapses, and to control the elements (devices) 21 and 22 based on the acquired signals. The notification control ECU 10 is hereinafter also simply referred to as "ECU 10."

The camera sensor 11 (surrounding information acquisition device) is installed on a rear surface of a room mirror (inner mirror/rear-view mirror) of the own vehicle V. The camera sensor 11 captures an image of a scenery forward of the own vehicle, recognizes (detects) 3D objects existing forward of the own vehicle V based on the captured image data, and calculates a relative relationship between the own vehicle V and each of the 3D objects. "The relative relationship between the own vehicle V and the 3D object" includes a distance from the own vehicle V to the 3D object, an orientation and a relative speed of the 3D object with respect to the own vehicle V, and the like. The 3D objects include moving objects (for example, other vehicles and pedestrians) and stationary objects (for example, a median strip, guard rails, and roadside trees). The moving object means a movable 3D object, and does not mean only a moving 3D object.

Moreover, the camera sensor 11 recognizes (detects) dividing lines extending forward of the own vehicle V based on the image data, and calculates a shape of each lane (region between two dividing lines adjacent to each other) based on the recognized dividing lines. That is, the lane is defined by the dividing lines. The camera sensor 11 is capable of calculating at least the shapes of a travel lane (lane on which the own vehicle V exists), a primary adjacent lane adjacent to the travel lane, and a secondary adjacent lane adjacent to the primary adjacent lane (on an opposite side to the travel lane).

The camera sensor 11 outputs the information acquired as described above to the ECU 10 as "surrounding information."

The turn signal switch 12 (direction indicator switch) is turned on or off in response to a position of a turn signal lever (operation unit) WL. The turn signal lever WL is the operation unit to be operated by a driver to operate (flash) turn signals (direction indicators), and is mounted to a steering column (not shown). The turn signal lever WL is configured to be movable, about a support shaft, to a right position being "a position rotated rightward by a predetermined angle θ from a neutral position" and a left position being "a position rotated leftward by the angle θ from the neutral position."

The turn signal switch 12 includes a right turn signal switch 12R and a left turn signal switch 12L. The right turn signal switch 12R is turned on (generates an ON signal) when the turn signal lever WL is at the right position, and is turned off (generates an OFF signal) otherwise. The left turn signal switch 12L is turned on (generates an ON signal) when the turn signal lever WL is at the left position, and is turned off (generates an OFF signal) otherwise. The ECU 10 acquires the signal generated by the turn signal switch 12, and detects the operation state of the turn signal lever WL based on the signal.

When the right turn signal switch 12R or the left turn signal switch 12L generates the ON signal, the ON signal is transmitted to the ECU (for example, a meter ECU) which controls the operation of the turn signals. When the ECU receives the ON signal, the ECU operates (flashes) the corresponding right turn signal or left turn signal.

The vehicle speed sensor 13 (vehicle speed detection device) detects a speed "v" of the own vehicle V (hereinafter referred to as "vehicle speed"), and outputs a detection signal thereof to the ECU 10.

The steering angle sensor 14 (steering input value detection device) detects a steering angle θs of a steering wheel, and outputs a detection signal thereof to the ECU 10. The steering angle θs is a type of an input value based on the steering operation (operation of the steering wheel) by the driver. The steering angle sensor 14 corresponds to an example of "a driving operation state detection device."

The meter panel 21 is installed in front of a driver's seat (at a position visually recognizable by the driver) of the own vehicle V. The speaker 22 is a component of a navigation system (not shown), and is installed to be close to a touch panel display (not shown). The meter panel 21 and the speaker 22 correspond to examples of "a notification device."

(Details of Operation)

Details of an operation of the ECU 10 are now described. With a configuration of the related art, specifically, a configuration in which whether or not execution of the notification control is required is determined based on predicted trajectories of the own vehicle V and an oncoming vehicle Vop, it is impossible to appropriately calculate shapes of the predicted trajectories during a first period (a while after a start of the right turn), and cannot consequently execute the notification control at a timing earlier than autonomous brake control. Meanwhile, when the notification control is to be executed at a timing earlier than the autonomous brake control, an unnecessary operation is liable to occur. Thus, in the first embodiment, the ECU 10 is configured to determine the collision possibility with the oncoming vehicle Vop without using the predicted trajectories.

Specifically, the ECU 10 first determines whether or not a precondition for the notification control is satisfied. The precondition is a condition which is satisfied when "there exists a possibility that the own vehicle V turns right while the oncoming vehicle Vop is approaching," and is satisfied when both of the following condition 1 and condition 2 are satisfied. Herein, a direction in which the opposing lane is positioned with respect to the travel lane is defined as "specific direction." In the first embodiment (and the second embodiment described below), the specific direction is the right direction.

(Condition 1) The oncoming vehicle Vop is approaching.

(Condition 2) The right turn signal switch 12R is turned on.

First, the condition 1 is described. The condition 1 is satisfied when a 3D object included in the surrounding information satisfies all of the following four conditions.

(Condition 1-1) The 3D object exists on the primary adjacent lane and/or the secondary adjacent lane.

(Condition 1-2) The type of the 3D object is a vehicle.

(Condition 1-3) The magnitude of the speed of the 3D object is equal to or higher than a predetermined speed threshold value voth.

(Condition 1-4) The 3D object is predicted to pass in the future on the right side of the current position of the own vehicle V.

The ECU 10 determines that the condition 1-1 is satisfied when a 3D object exists on the primary adjacent lane and/or the secondary adjacent lane included in the surrounding information, and determines that the condition 1-1 is not satisfied otherwise. When the dividing lines are discontinued at an intersection, the ECU 10 extends the dividing lines toward an extension direction thereof, to thereby determine whether or not the condition 1-1 is satisfied.

The ECU 10 is configured to be capable of identifying the type of the 3D object through use of a well-known method of pattern matching. When the identified type of the 3D object is the vehicle, the ECU 10 determines that the condition 1-2 is satisfied, and determines that the condition 1-2 is not satisfied otherwise.

The ECU 10 calculates a ground speed vo of the 3D object from the relative speed of the 3D object included in the surrounding information. When the magnitude of the ground speed vo is equal to or higher than the speed threshold value voth ($|vo| \geq voth$), the ECU 10 determines that the condition 1-3 is satisfied, and determines that the condition 1-3 is not satisfied otherwise.

Figure 2A:
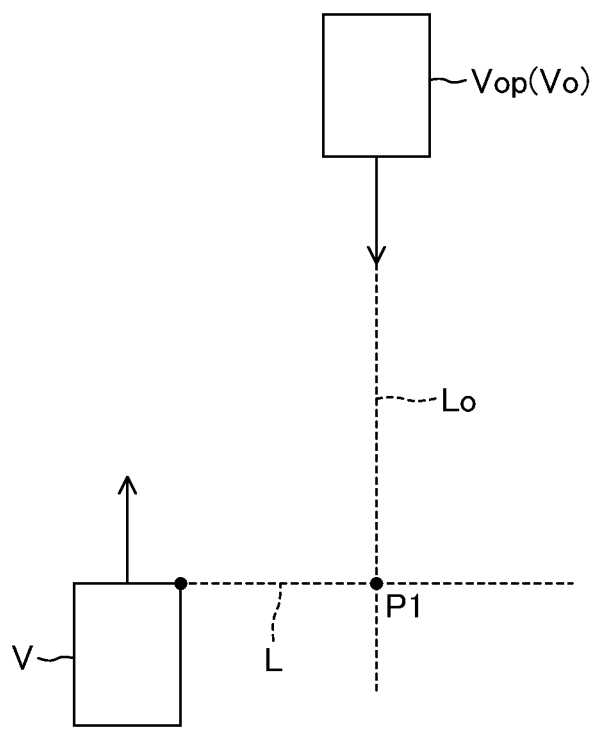
FIG. 2A is a diagram for illustrating an example at the time when a condition 1-4 is satisfied.
Figure 2B:
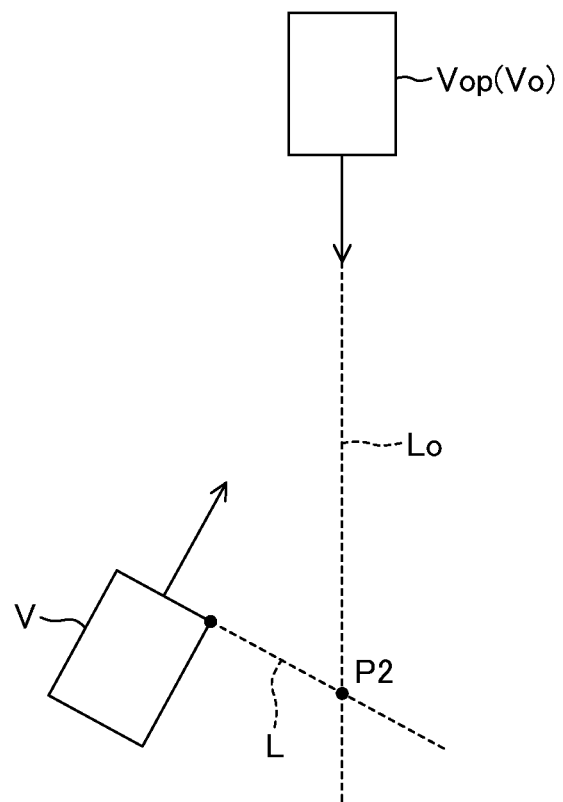
FIG. 2B is a diagram for illustrating another example at the time when the condition 1-4 is satisfied.
Figure 2C:
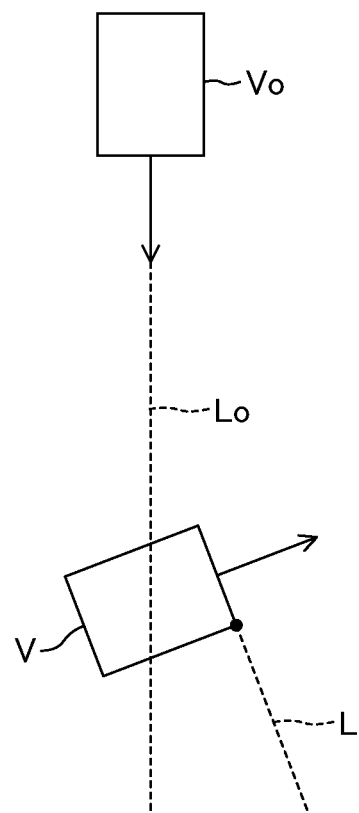
FIG. 2C is a diagram for illustrating an example at the time when the condition 1-4 is not satisfied.

With reference to FIG. 2A to FIG. 2C, the condition 1-4 is described. FIG. 2A to FIG. 2C are diagrams for illustrating a method of determining whether or not the condition 1-4 is satisfied. In any one of the examples of FIG. 2A to FIG. 2C, it is assumed that the condition 1-1 to the condition 1-3 are satisfied. As illustrated in FIG. 2A to FIG. 2C, the ECU 10 calculates a moving direction (see arrows) of another vehicle Vo, and sets a virtual extension Lo that extends along the moving direction. The moving direction of the another vehicle Vo may be calculated based on a transition of "a position of the another vehicle Vo included in the surrounding information (that is, a distance from the own vehicle V to the another vehicle Vo and an orientation of the another vehicle Vo with respect to the own vehicle)." Moreover, the extension Lo may be set as, for example, a half-line having, as a start point, a center portion of a front end of the another vehicle Vo.

The ECU 10 determines that the condition 1-4 is satisfied when the extension Lo passes on the right side (specific direction side) of the current position of the own vehicle V, and determines that the condition 1-4 is not satisfied otherwise. The ECU 10 determines whether or not the extension Lo passes on the right side of the current position of the own vehicle V based on whether or not the extension Lo and an extension L (described below) intersect with each other. That is, the ECU 10 sets, as the extension L, a virtual line that has a right front corner portion of the own vehicle V as a start point and extends toward a vehicle-width outside direction (that is, a direction orthogonal to the moving direction (see the arrows) of the own vehicle V and away from the own vehicle). After that, the ECU 10 determines whether or not the extension Lo intersects with the extension L. When the extension Lo intersects with the extension L, the ECU 10 determines that the extension Lo passes on the right side of the current position of the own vehicle V, that is, the another vehicle Vo is predicted to pass in the future on the right side of the current position of the own vehicle V (the condition 1-4 is satisfied). Meanwhile, when the extension Lo does not intersect with the extension L, the ECU 10 determines that the extension Lo does not pass on the right side of the current position of the own vehicle V, that is, the another vehicle Vo is not predicted to pass in the future on the right side of the current position of the own vehicle V (the condition 1-4 is not satisfied).

In the examples of FIG. 2A and FIG. 2B, the extension Lo intersects with the extension L at a point P1 and a point P2, respectively. Meanwhile, in the example of FIG. 2C, the extension Lo does not intersect with the extension L. Thus, the ECU 10 determines that the condition 1-4 is satisfied in the examples of FIG. 2A and FIG. 2B. In other words, the ECU 10 determines that the condition 1 is satisfied, and the another vehicle Vo corresponds to "an oncoming vehicle Vop approaching the own vehicle V." Moreover, the ECU 10 determines that the condition 1-4 is not satisfied in the example of FIG. 2C. In other words, the ECU 10 determines that the condition 1 is not satisfied, and the another vehicle Vo does not correspond to "an oncoming vehicle Vop approaching the own vehicle V." An order of the determination of the condition 1-1 to the condition 1-4 is not particularly determined. Moreover, the condition 1-3 is not required to be included in the requirement for the satisfaction of the condition 1.

The condition 2 is now described. The ECU 10 determines that the condition 2 is satisfied when the right turn signal switch 12R is turned on, and determines that the condition 2 is not satisfied when the right turn signal switch 12R is turned off. "When the right turn signal switch 12R is turned on" can also be considered as a state in which the turn signal lever WL is in the operation state corresponding to the operation of operating the turn signals on the right side. An order of the determination of the condition 1 and the condition 2 is not particularly determined.

When both of the condition 1 and the condition 2 are satisfied, and the precondition is accordingly satisfied (that is, there exists the possibility that the own vehicle V turns right while the oncoming vehicle Vop is approaching), the ECU 10 determines whether or not a first execution condition for the notification control is satisfied. The first execution condition is a condition which is satisfied when "there exists a possibility that the own vehicle collides with the oncoming vehicle Vop before the own vehicle completes the right turn", and is satisfied when both of the following condition 3 and condition 4 are satisfied. "Complete the right turn" means that, when the own vehicle V turns right in an intersection, a rear end of the own vehicle V enters "an intersecting lane that intersects with, in the intersection, a lane on which the own vehicle V has been traveling before the right turn," and means that, when the own vehicle V turns right on the opposing lane in order to enter a parking lot of a facility or the like along the opposing lane, the rear end of the own vehicle V enters the parking lot or the like.

(Condition 3) A lateral moving distance dy of the own vehicle V after elapse of a predetermined reference period Tc is equal to or longer than a predetermined distance threshold value Dth.

(Condition 4) A period Tx required for the own vehicle V to virtually pass the oncoming vehicle Vop in the longitudinal direction is equal to or longer than a predetermined lower limit period Tl, and equal to or shorter than a predetermined upper limit period Tu ($\leq Tc$)

Figure 3:
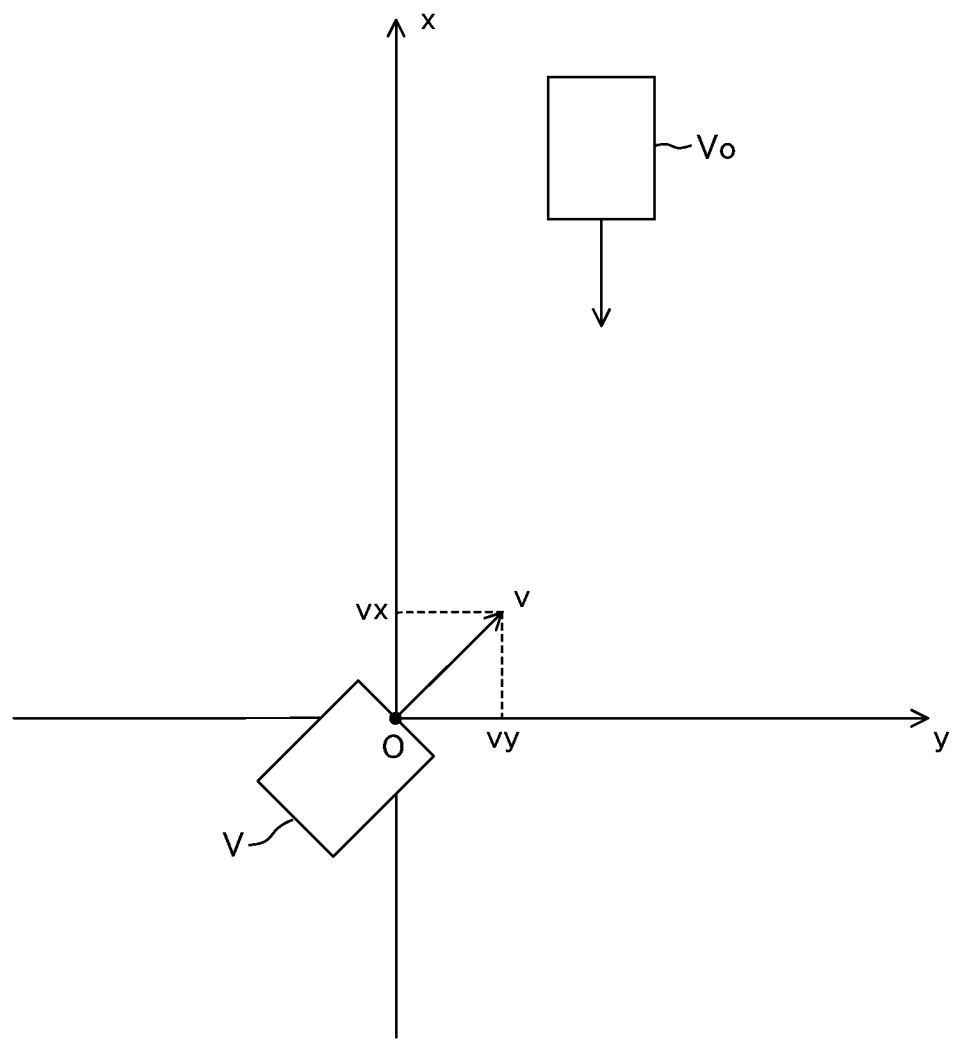
FIG. 3 is a diagram for illustrating a setting method for an xy coordinate system.

First, the condition 3 is described. When the precondition is satisfied, the ECU 10 sets an xy coordinate system. Specifically, as illustrated in FIG. 3, the ECU 10 sets an "x" axis so that "a positive direction of the 'x' axis" directs toward "a direction opposite to the moving direction of the oncoming vehicle Vop," and sets a "y" axis so that "a positive direction of the 'y' axis" is orthogonal to the "x" axis and directs toward the specific direction (in the first embodiment, rightward) by setting a center portion of a front end of the own vehicle V as an origin. The position of the origin is not limited to the center portion of the front end of the own vehicle V. The "x" direction is hereinafter also referred to as "longitudinal direction," and the "y" direction is also referred to as "lateral direction."

After that, the ECU 10 divides a vehicle speed "v" acquired from the vehicle speed sensor 13 into a longitudinal speed vx being a component in the longitudinal direction and a lateral speed vy being a component in the lateral direction. The ECU 10 uses a well-known method to estimate a moving distance "d" of the own vehicle V in a case in which it is assumed that the own vehicle V moves from the current time point for the reference period Tc based on the first vehicle information including the steering angle θs acquired from the steering angle sensor 14, a steering angular velocity ωs (time derivative of the steering angle θs), and the lateral speed vy. After that, the ECU 10 calculates, as "lateral moving distance dy," a component of the moving distance "d" in the lateral direction. The moving distance "d" is estimated based on the current steering angle θs, the current steering angular velocity ωs, and the current lateral speed vy, but the configuration is not limited to this example, and there may be provided such a configuration that the moving distance "d" is estimated also based on, for example, a change rate of the steering angle θs, a change rate of the steering angular velocity ωs, and a change rate of the lateral speed vy over a predetermined period up to the current time. Moreover, the first vehicle information may include, in place of or in addition to the steering angle θs and the steering angular velocity ωs, a steering torque acquired from a steering torque sensor (not shown). The reference period Tc corresponds to an example of "a first reference period."

After that, the ECU 10 determines whether or not the lateral moving distance dy is equal to or longer than the predetermined distance threshold value Dth. The ECU 10 determines that the condition 3 is satisfied when a relationship of "dy≥Dth" is satisfied, and determines that the condition 3 is not satisfied when a relationship of "dy≤Dth" is satisfied. As the reference period Tc, an average period required for the own vehicle V to complete crossing of the lane is set, and a value of the reference period Tc, is, for example, 4.0 seconds. Moreover, as the distance threshold value Dth, an average lane width is set, and a value of the distance threshold value Dth is, for example, 3.5 m.

That is, the condition 3 is a condition which is satisfied when a possibility that the own vehicle V completes the crossing of "the intersection (in a strict sense, an intersection with which the opposing lane merges) or the opposing lane" when the own vehicle V moves from the current position for "the average reference period Tc required to complete the crossing of the lane" is high. With this configuration, when the own vehicle V changes the lane, a possibility that the condition 3 is not satisfied is extremely high. Thus, by introducing the condition 3, it is possible to appropriately determine whether a reason for the turning-on of the right turn signal switch 12R of the own vehicle V is a right turn or a lane change. The condition 3 corresponds to an example of "a crossing condition." "Complete crossing of an intersection or an opposing lane" is hereinafter sometimes simply referred to as "complete crossing of an intersection."

As apparent from description given above, the condition 3 assumes that "the lateral direction ('y' direction) is substantially parallel to the lane width direction (that is, the moving direction (−x direction) of the oncoming vehicle Vop is substantially parallel to the extension direction of the opposing lane."

The condition 4 is now described. The ECU 10 is configured to determine whether or not the condition 4 is satisfied under the state in which the condition 3 is satisfied. When the condition 3 is satisfied, the ECU 10 calculates the period Tx until the own vehicle V virtually passes the oncoming vehicle Vop in the longitudinal direction when it is assumed that "the own vehicle V executes a uniform linear motion at the longitudinal speed vx, and the oncoming vehicle Vop moves while maintaining the current moving state." "Virtually pass in the longitudinal direction" means that the own vehicle V and the oncoming vehicle Vop approach in the longitudinal direction, the "x" coordinates thereof temporarily match each other, and, after that, the vehicles separate from each other in the longitudinal direction. Moreover, "a time point at which . . . virtually pass in the longitudinal direction" means a time point at which the "x" coordinate of the own vehicle V and the "x" coordinate of the oncoming vehicle Vop match each other. The own vehicle V does not actually pass the oncoming vehicle Vop, and hence the period Tx is hereinafter also referred to as "virtual passing period Tx." The virtual passing period Tx may be calculated by dividing "a component in the longitudinal direction of the distance from the own vehicle V to the oncoming vehicle Vop" by "a sum of 'a magnitude of the longitudinal speed vx of the own vehicle V' and 'a magnitude of the vehicle speed vop of the oncoming vehicle Vop'."

The ECU 10 determines whether or not the virtual passing period Tx is equal to or longer than the predetermined lower limit period Tl and is equal to or shorter than the predetermined upper limit period Tu, determines that the condition 4 is satisfied when a relationship of "Tl≤Tx≤Tu" is satisfied, and determines that the condition 4 is not satisfied when a relationship of "Tx<Tl" or a relationship of "Tu<Tx" is satisfied. When a position at which the own vehicle V virtually passes the oncoming vehicle Vop in the longitudinal direction is defined as "virtual passing point Px," the virtual passing point Px is positioned apart from the current position of the own vehicle V (that is, the origin) by vx·Tx toward the +x direction. The virtual passing point Px is a point that is positioned farther as the virtual passing period Tx becomes longer, and is positioned closer as the virtual passing period Tx becomes shorter. In other words, the virtual passing point Px is positioned far when the oncoming vehicle Vop is moving at a far position and/or the magnitude of the vehicle speed vop is relatively low (within a range equal to or higher than the speed threshold value voth). Moreover, the virtual passing point Px is positioned close when the oncoming vehicle Vop is moving at a close position and/or the magnitude of the vehicle speed vop is relatively high.

As the upper limit period Tu, a predetermined value (for example, 3.2 seconds) equal to or shorter than the reference period Tc is set. When the condition 4 is satisfied due to the period Tu satisfying a relationship of "Tu≤Tc", the virtual passing point Px can be positioned in the intersection. Accordingly, the upper limit period Tu can be considered as "the maximum value of the virtual passing period Tx for the virtual passing point Px to remain within the intersection." Moreover, when the distance to the oncoming vehicle Vop becomes shorter to a certain extent in a process of the right turn of the own vehicle V, the driver can recognize the oncoming vehicle Vop, and it is thus considered that the driver voluntarily executes a driving operation (typically, a brake operation) (that is, temporarily stops the rightward steering operation) in order to avoid the collision with the oncoming vehicle Vop. Based on this knowledge, as the lower limit period Tl, "the minimum value of the virtual passing period Tx in which the driver may continue the rightward steering operation due to a high possibility that the driver cannot recognize (visually recognize) the oncoming vehicle Vop" is set. The value of the lower limit period Tl is, for example, 1.0 second. The upper limit period Tu and the lower limit period Tl may be variably set. That is, the period Tu and the period Tl may be respectively set to different values between the case in which the oncoming vehicle Vop is moving on the primary adjacent lane and the case in which the oncoming vehicle Vop is moving on the secondary adjacent lane. In this case, the reference period Tc and the distance threshold value Dth may also be changed in response to the changes in the period Tu and the period Tl.

That is, the condition 4 is a condition which is satisfied when a possibility that the own vehicle V collides with the oncoming vehicle Vop in the intersection (that is, before the completion of the crossing of the intersection) when the own vehicle V turns right while maintaining the current longitudinal speed vx is high.

When both of the condition 3 and the condition 4 are satisfied, and the first execution condition is consequently satisfied (that is, there exists the possibility that the own vehicle V collides with the oncoming vehicle Vop before the completion of the right turn), the ECU 10 executes the notification control (control of notifying the driver of the existence of the oncoming vehicle). Specifically, the ECU 10 executes the following processing 1 and processing 2 as the notification control.

(Processing 1) Displaying a predetermined mark (for example, a mark for explicitly indicating the approach of the oncoming vehicle Vop) on the meter panel 21

(Processing 2) Causing the speaker 22 to utter a predetermined message (for example, a message "Be aware of approaching vehicle")

The ECU 10 is configured to determine whether or not the execution of the notification control is required and whether or not the execution of the collision avoidance control is required in parallel. The autonomous brake control being a type of the collision avoidance control is executed when a TTC for the oncoming vehicle Vop is equal to or shorter than a second TTC threshold value, and the lower limit period Tl is set in advance to such a value that the TTC does not become equal to or shorter than the second TTC threshold value during a period in which the relationship of "Tl≤Tx" is satisfied. Thus, a situation in which the autonomous brake control is executed during the execution of the notification control does not occur.

Figure 4:
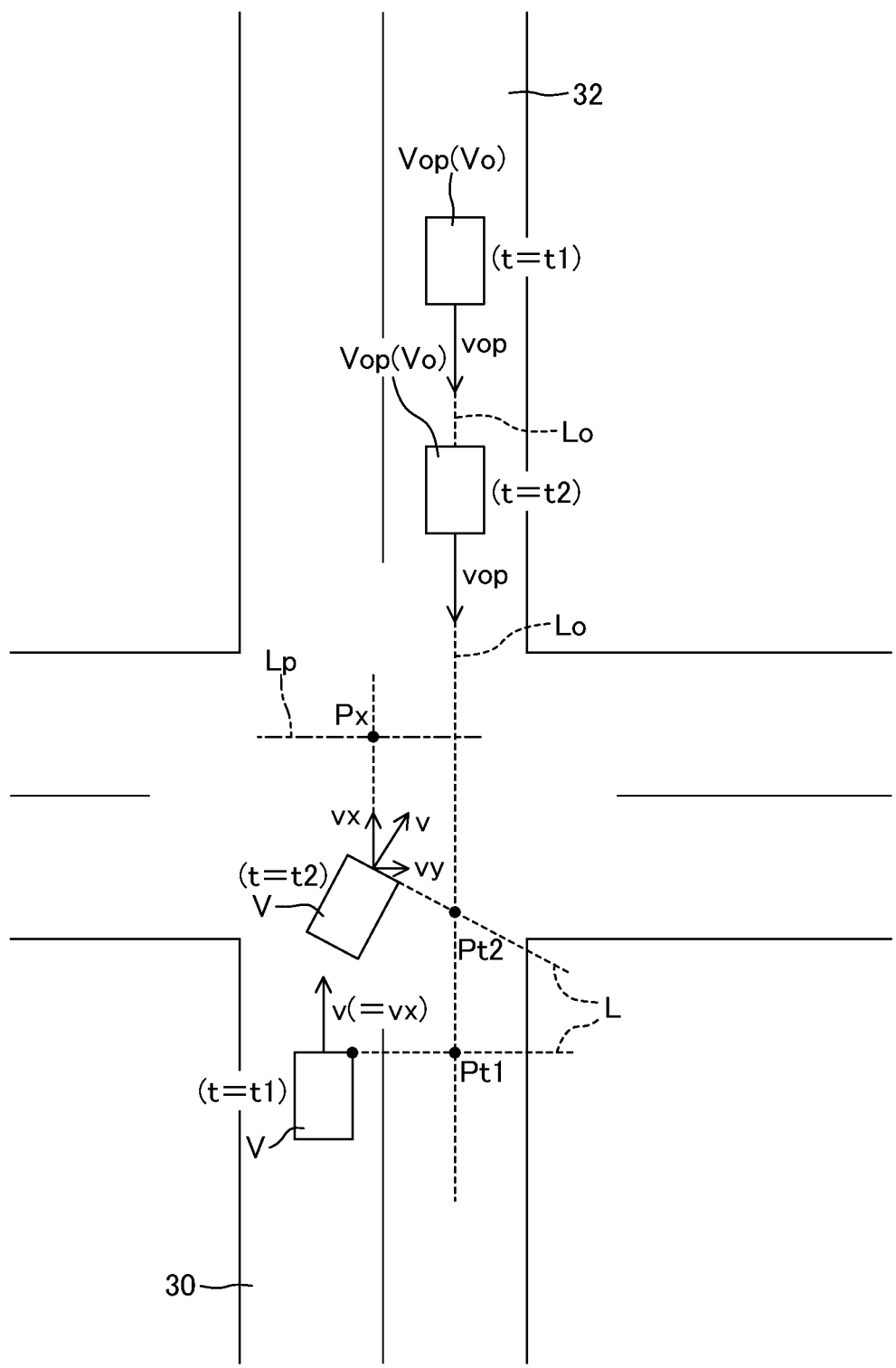
FIG. 4 is a diagram for illustrating a precondition and a first execution condition for notification control.

With reference to FIG. 4, a more specific description is given of the precondition and the first execution condition of the notification control. In FIG. 4, a part of a process of the right turn, at an intersection, of the own vehicle V which has moved on a travel lane 30 toward the +x direction is illustrated. In this example, there are illustrated behaviors of the own vehicle V and another vehicle Vo when the time "t" is t1 and t2 (>t1). The driver of the own vehicle V is not executing the steering operation at t=t1, and is executing the rightward steering operation at t=t2. The right turn signal switch 12R of the own vehicle V has been turned on since a time point shortly before the time "t" reaches t1. Moreover, the another vehicle Vo is moving at a vehicle speed that satisfies the condition that the magnitude of the vehicle speed is equal to or higher than the speed threshold value voth. The illustration of the xy coordinate system is omitted.

As illustrated in FIG. 4, at t=t1 and t=t2, the another vehicle Vo exists on the primary adjacent lane, has the type thereof being the vehicle, has the magnitude of the vehicle speed equal to or higher than the speed threshold value voth, and the extension Lo of the another vehicle Vo intersects with the extension L of the own vehicle V at a point Pt1 (t=t1) and Pt2 (t=t2), and hence all of the condition 1-1 to the condition 1-4 are satisfied. Thus, the ECU 10 determines that the condition 1 is satisfied at t=t1 and t=t2 (that is, the another vehicle Vo is an oncoming vehicle Vop that is moving on an opposing lane 32 toward the direction approaching the own vehicle V). The another vehicle Vo is hereinafter referred to as "oncoming vehicle Vop." Moreover, the right turn signal switch 12R of the own vehicle V is turned on at t=t1 and t=t2, and hence the ECU 10 determines that the condition 2 is satisfied. Accordingly, the ECU 10 determines that the precondition for the notification control is satisfied.

Thus, the ECU 10 determines whether or not the condition 3 is satisfied in order to determine whether or not the first execution condition for the notification control is satisfied. As described above, the steering operation is not executed at t=t1, and hence the steering angle θs and the steering angular velocity ωs are both substantially zero. Moreover, the own vehicle V is moving toward the +x direction, and hence the vehicle speed "v" is equal to the longitudinal speed vx, and the lateral speed vy is zero (v=vx and vy=0). Accordingly, the lateral moving distance dy is zero at t=t1, a relationship of "dy<Dth" is satisfied, and hence the ECU 10 determines that the condition 3 is not satisfied at t=t1.

Meanwhile, the rightward steering operation is being executed at t=t2, and the own vehicle V is consequently moving right diagonally forward. When the lateral moving distance dy calculated based on the steering angle θs, the steering angular velocity ωs, and the lateral speed vy satisfies the relationship of "dy≥Dth" at t=t2, the ECU 10 determines that the condition 3 is satisfied at t=t2 (that is, a possibility that the own vehicle V completes the crossing of the intersection (intersection with which the opposing lane 32 merges) when the own vehicle V moves, from the current position, for the reference period Tc is high).

After that, the ECU 10 calculates the virtual passing period Tx in order to determine whether or not the condition 4 is satisfied at t=t2. In this example, the own vehicle V and the oncoming vehicle Vop virtually pass each other in the longitudinal direction on a line Lp that extends in parallel to the "y" axis. Thus, the virtual passing point Px is positioned at an intersection between the "x" axis (see a broken line) and the line Lp. When the ECU 10 calculates the virtual passing period Tx, the ECU 10 determines whether or not the relationship of "Tl≤Tx≤Tu" is satisfied. For example, when the virtual passing period Tx is 2.0 seconds at t=t2, the relationship of "Tl≤Tx≤Tu" is satisfied, and hence the ECU 10 determines that the condition 4 is satisfied at t=t2 (that is, a possibility that the own vehicle V collides with the oncoming vehicle Vop in the intersection when the own vehicle V turns right while maintaining the current longitudinal speed vx is high). Consequently, the ECU 10 determines that the first execution condition for the notification control is satisfied at t=t2, and executes the notification control. In FIG. 4, a case in which the own vehicle V turns right at the intersection is illustrated, but the ECU 10 executes equivalent processing also when the own vehicle V turns right on an opposing lane in order to enter a parking lot of a facility or the like along the opposing lane.

As a result of the execution of the notification control, the driver can recognize the existence of the oncoming vehicle Vop at a timing earlier than the autonomous brake control, and hence can execute the driving operation for avoiding the collision with the oncoming vehicle Vop, with the result that a frequency of the execution of the autonomous brake control can be reduced. Moreover, by setting the upper limit period Tu to the predetermined value equal to or shorter than the reference period Tc ("the maximum value of the period Tx for the virtual passing point Px to remain within the intersection"), and setting the lower limit period Tl to "the minimum value of the period Tx in which the driver may continue the rightward steering operation due to the high possibility that the driver cannot recognize the oncoming vehicle Vop," the unnecessary operation of the notification control can be suppressed.

Figure 5A:
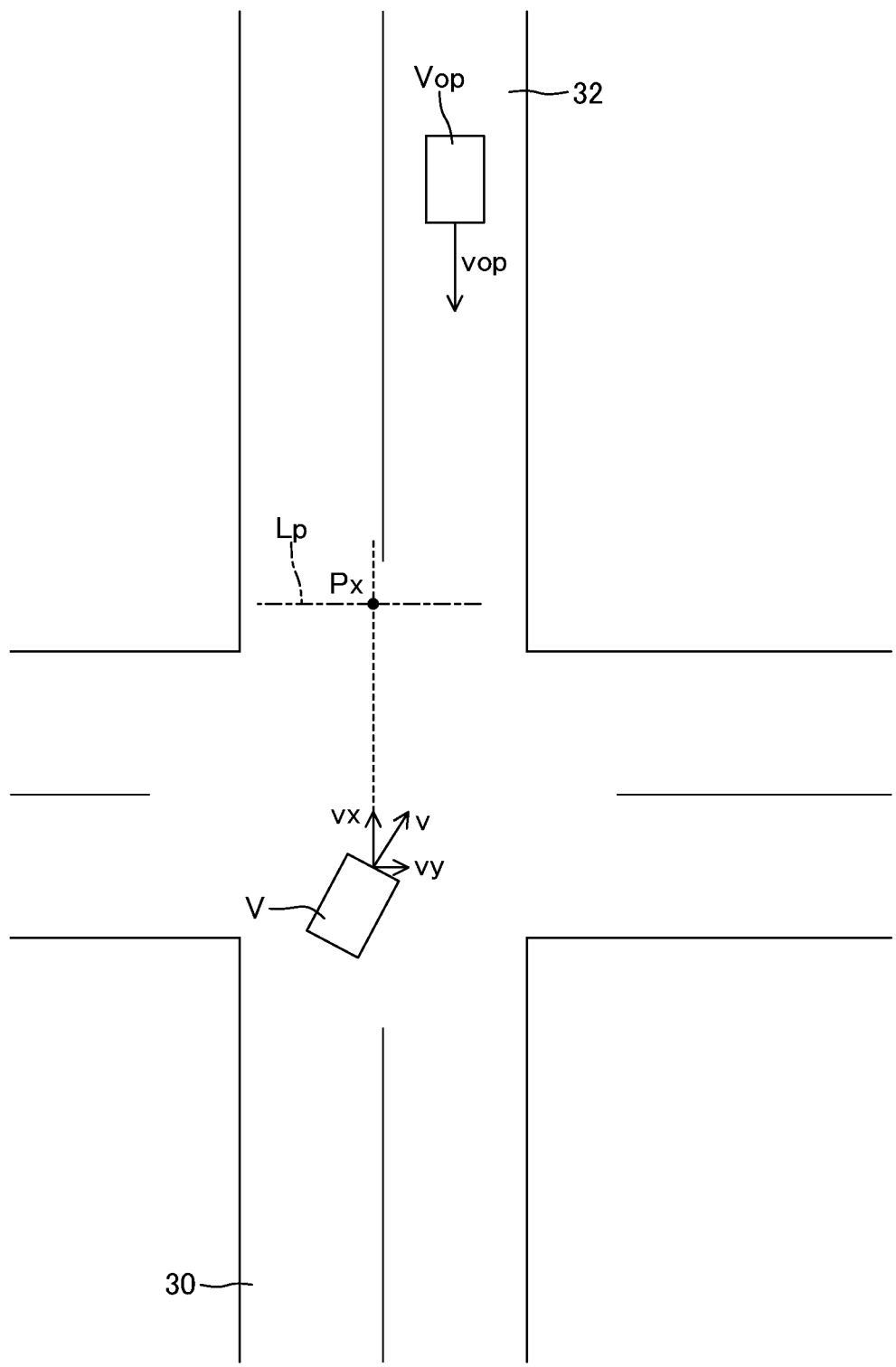
FIG. 5A is a diagram for illustrating an unnecessary operation of the notification control.
Figure 5B:
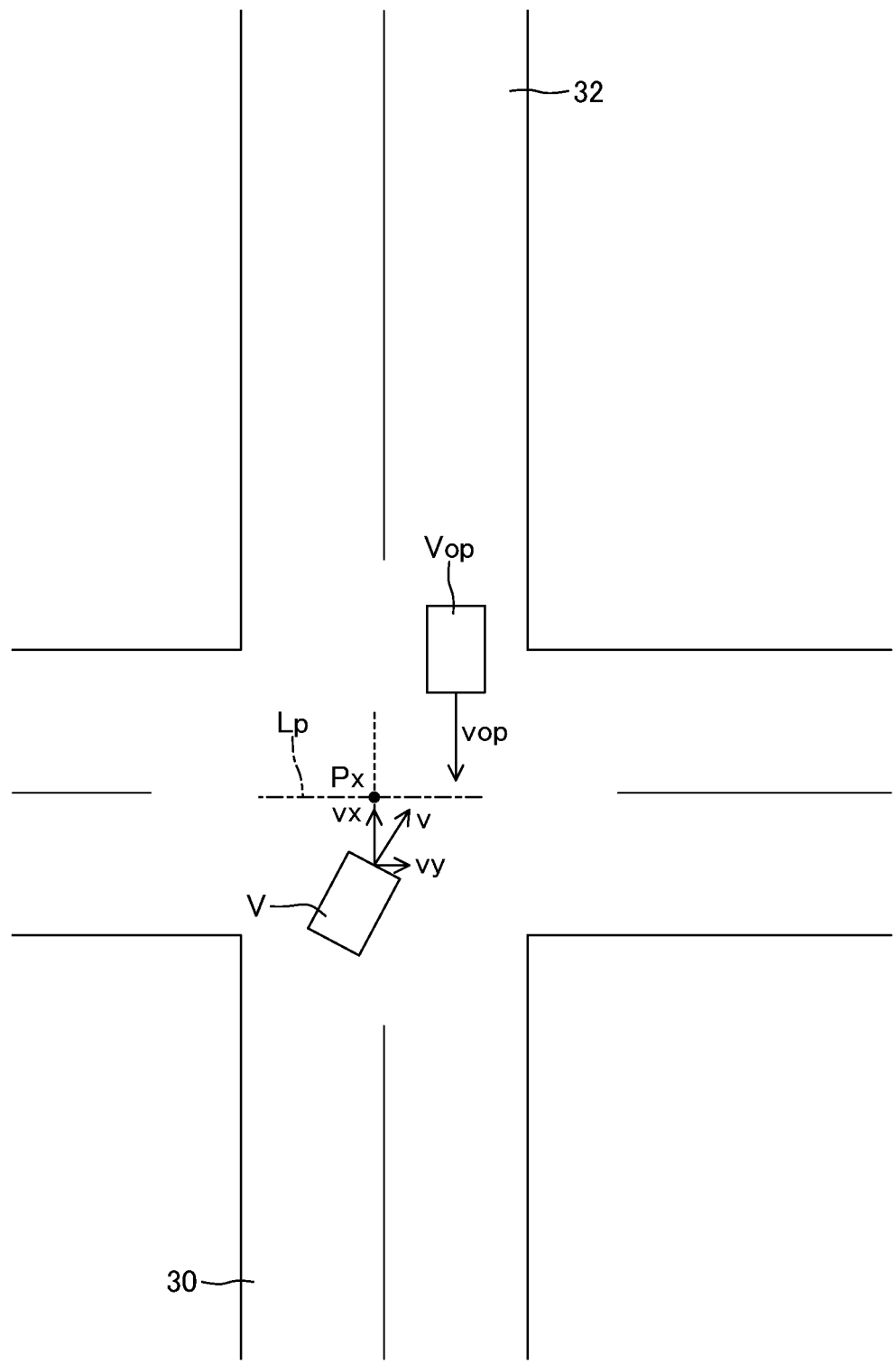
FIG. 5B is a diagram for illustrating the unnecessary operation of the notification control.

With reference to FIG. 5A and FIG. 5B, the unnecessary operation of the notification control is now described. FIG. 5A is a diagram for illustrating an example of the unnecessary operation when the upper limit period Tu is set to a value longer/larger than the reference period Tc. In this example, all of the condition 1 to the condition 3 are satisfied. As illustrated in FIG. 5A, the oncoming vehicle Vop is moving at a relatively far position, and hence the virtual passing period Tx is relatively long, and the virtual passing point Px is consequently positioned outside an intersection. This means that the virtual passing period Tx is longer than the reference period Tc (Tx>Tc). Thus, when the virtual passing point Px is positioned outside the intersection, the own vehicle V does not collide with the oncoming vehicle Vop in the intersection. When the upper limit period Tu is longer than the reference period Tc, the relationship of "Tx≤Tu" can be satisfied even when the virtual passing point Px is positioned outside the intersection, and hence there occurs a situation in which the notification control is executed for the oncoming vehicle Vop that does not in actuality have the collision possibility, resulting in the unnecessary operation. In contrast, in the first embodiment, the upper limit period Tu is set to the predetermined value ("the maximum value of the period Tx for the virtual passing point Px to remain within the intersection") equal to or shorter than the reference period Tc. Accordingly, when the virtual passing point Px exists outside the intersection, the notification control is not executed, and hence the unnecessary operation can be suppressed.

FIG. 5B is a diagram for illustrating an example of the unnecessary operation when the lower limit period Tl is set to a value shorter than "the minimum value of the period Tx in which the driver may continue the rightward steering operation due to the high possibility that the driver cannot recognize the oncoming vehicle Vop." In this example, all of the condition 1 to the condition 3 are satisfied. As illustrated in FIG. 5B, the oncoming vehicle Vop is moving at a relatively near position, and hence the virtual passing period Tx is relatively short, and the virtual passing point Px is consequently positioned close to the own vehicle V. At this time point, the driver can recognize the oncoming vehicle Vop, and hence a possibility that the driver voluntarily executes the driving operation for avoiding the collision is extremely high. When the lower limit period Tl is set to the above-mentioned value, the relationship of "Tl≤Tx" may be satisfied even in the case in which the driver voluntarily thus executes the collision avoidance operation, and hence there occurs the situation in which the notification control is executed for the oncoming vehicle Vop that the driver has already recognized, resulting in the unnecessary operation. In contrast, in the first embodiment, the lower limit period Tl is set to "the minimum value of the virtual passing period Tx in which the driver may continue the rightward steering operation due to the high possibility that the driver cannot recognize the oncoming vehicle Vop." Accordingly, when the oncoming vehicle Vop is so close that the driver can recognize the oncoming vehicle Vop, the notification control is not executed, and hence the unnecessary operation can be suppressed.

When the driver does not voluntarily execute the collision avoidance operation even after the period Tx becomes shorter than the lower limit period Tl, the TTC for the oncoming vehicle Vop subsequently decreases to a value equal to or shorter than the second TTC threshold value, and hence the autonomous brake control is executed, with the result that the collision with the oncoming vehicle Vop can appropriately be avoided. That is, the notification control has a purpose of notifying the driver of the existence of the oncoming vehicle Vop when there exists a high possibility that the driver cannot recognize the oncoming vehicle Vop even in the case in which there exists the possibility that the own vehicle V collides with the oncoming vehicle Vop before the completion of the right turn, and does not have a purpose of providing a notification of the existence of the oncoming vehicle Vop even in the case in which the oncoming vehicle Vop is so close that the driver can recognize the oncoming vehicle Vop.

(Specific Operation)

A specific operation of the ECU 10 is now described. The CPU of the ECU 10 is configured to repeatedly execute a routine illustrated as a flowchart of FIG. 6 each time a predetermined calculation period elapses during a period in which an ignition switch is at an ON position.

Figure 6:
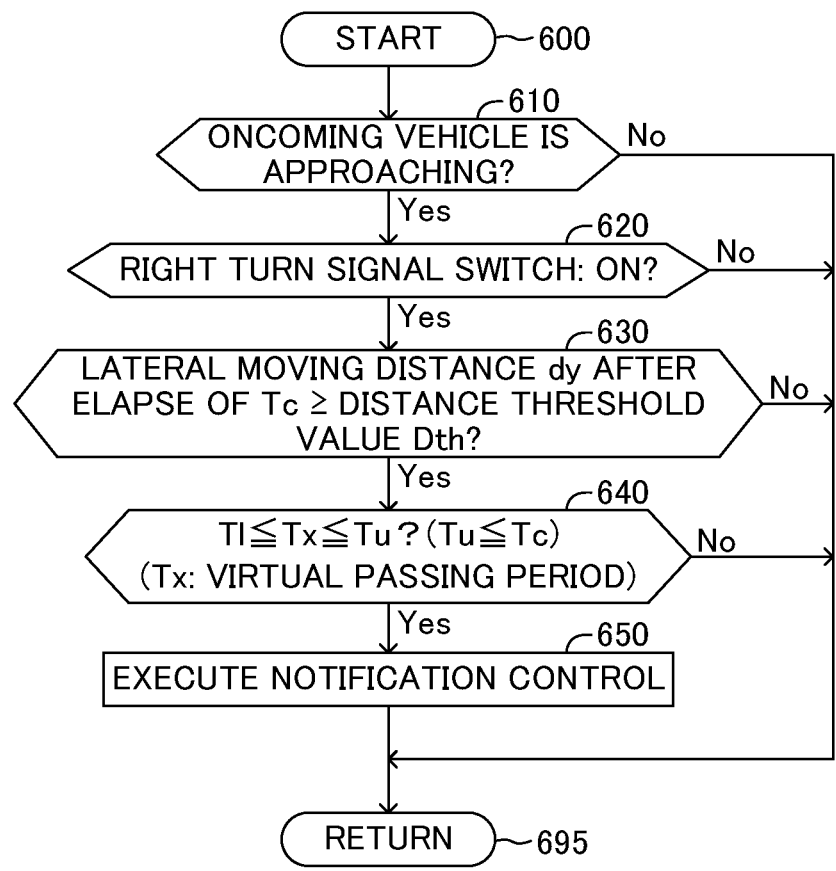
FIG. 6 is a flowchart for illustrating a routine executed by a CPU of a notification control ECU of the apparatus of the first embodiment.

The CPU starts processing from Step 600 of FIG. 6 at a predetermined timing, and the process proceeds to Step 610. Then, the CPU determines whether or not an oncoming vehicle Vop is approaching based on the surrounding information (condition 1). When an oncoming vehicle Vop does not exist, or an oncoming vehicle Vop exists, but is not approaching (typically, is turning), the CPU makes a determination of "No" (that is, determines that the condition 1 is not satisfied (the precondition is not satisfied)) in Step 610, and the process proceeds to Step 695. Then, the CPU temporarily finishes the routine. Meanwhile, when the oncoming vehicle Vop is approaching, the CPU makes a determination of "Yes" in Step 610 (that is, determines that the condition 1 is satisfied), and the process proceeds to Step 620.

In Step 620, the CPU determines whether or not the right turn signal switch 12R is turned on (condition 2). When the right turn signal switch 12R is turned off, the CPU makes a determination of "No" in Step 620 (that is, determines that the condition 2 is not satisfied (the precondition is not satisfied)), and the process proceeds to Step 695. Then, the CPU temporarily finishes the routine. Meanwhile, when the right turn signal switch 12R is turned on, the CPU makes a determination of "Yes" in Step 620 (that is, determines that the condition 2 is satisfied (the precondition is satisfied)), and the process proceeds to Step 630.

In Step 630, the CPU determines whether or not the lateral moving distance dy of the own vehicle V after the elapse of the reference period Tc is equal to or longer than the distance threshold value Dth (condition 3). When the relationship of "dy<Dth" is satisfied, the CPU makes a determination of "No" (that is, determines that the condition 3 is not satisfied (the first execution condition is not satisfied)) in Step 630, and the process proceeds to Step 695. Then, the CPU temporarily finishes the routine. Meanwhile, when the relationship of "dy≥Dth" is satisfied, the CPU makes a determination of "Yes" (that is, determines that the condition 3 is satisfied) in Step 630, and the process proceeds to Step 640.

In Step 640, the CPU determines whether or not the virtual passing period Tx satisfies the relationship of "Tl≤Tx≤Tu" (Tu≤Tc) (condition 4). When the relationship of "Tx≤Tl" or the relationship of "Tu≤Tx" is satisfied, the CPU makes a determination of "No" (that is, determines that the condition 4 is not satisfied (the first execution condition is not satisfied)) in Step 640, and the process proceeds to Step 695. Then, the CPU temporarily finishes the routine. Meanwhile, when the relationship of "Tl≤Tx≤Tu" is satisfied, the CPU makes a determination of "Yes" (that is, determines that the condition 4 is satisfied (the first execution condition is satisfied)) in Step 640, and the process proceeds to Step 650.

In Step 650, the CPU controls the meter panel 21 to display the predetermined mark, and controls the speaker 22 to cause the speaker 22 to utter the predetermined message. As a result, the notification control is executed. After that, the process proceeds to Step 695, and the CPU temporarily finishes the routine.

As described above, according to the apparatus of the first embodiment, it is possible to simultaneously achieve the execution of the notification control at the timing earlier than the autonomous brake control and the suppression of the unnecessary operation of the notification control during the right turn.

Second Embodiment

Description is now given of a notification control apparatus for a vehicle according to the second embodiment (hereinafter also referred to as "apparatus of the second embodiment") of the present invention with reference to the drawings. The same components as those in the first embodiment are denoted by the same reference symbols. The apparatus of the second embodiment is different from the apparatus of the first embodiment in the method of determining "whether or not a possibility that the own vehicle V completes the crossing of the intersection after the elapse of the reference period is high." A specific description is now given of the difference from the apparatus of the first embodiment.

(Configuration)

Figure 7:
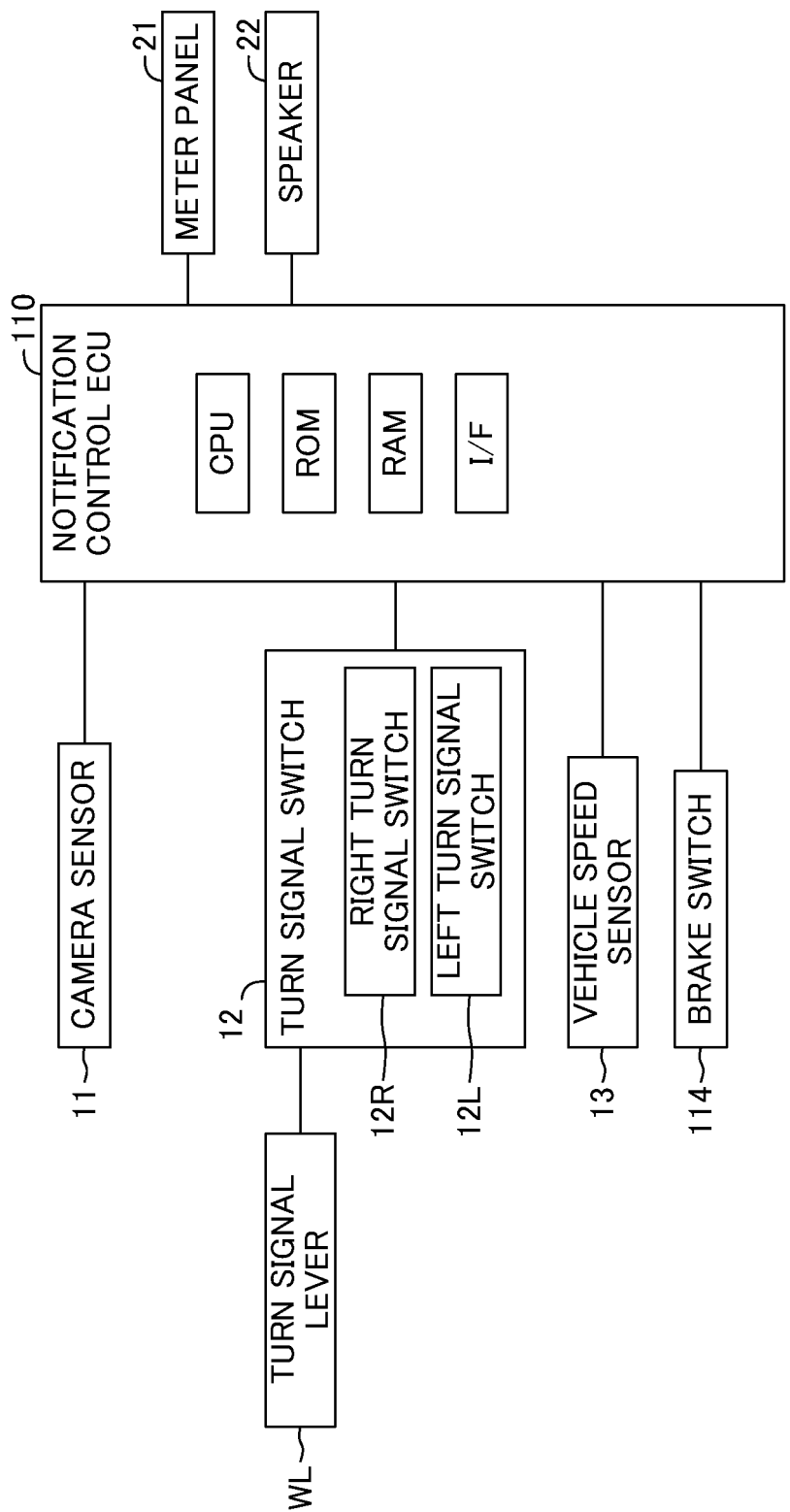
FIG. 7 is a schematic configuration diagram of a notification control apparatus for a vehicle according to a second embodiment (apparatus of the second embodiment) of the present invention.

As illustrated in FIG. 7, the apparatus of the second embodiment includes a notification control ECU 110 (hereinafter also simply referred to as "ECU 110"). The ECU 110 is different from the ECU 10 in that the ECU 110 includes a brake switch 114 in place of the steering angle sensor 14. The brake switch 114 is turned on (generates an ON signal) when a brake pedal (not shown) is operated (depressed) by the driver, and is turned off (generates an OFF signal) when the brake pedal is not operated. The ECU 110 acquires the signal generated by the brake switch 114, and detects the presence or absence of the operation of the brake pedal based on the signal. The brake switch corresponds to an example of "the driving operation state detection device."

(Details of Operation)

Also in the second embodiment, the ECU 110 is configured to determine the collision possibility with an oncoming vehicle Vop without using the predicted trajectories. Specifically, when both of the condition 1 and the condition 2 described in the first embodiment are satisfied, and the precondition is consequently satisfied, the ECU 110 determines whether or not a second execution condition for the notification control is satisfied. The second execution condition is a condition which is satisfied when "there exists the possibility that the own vehicle collides with the oncoming vehicle Vop before the own vehicle completes the right turn," and is satisfied when all of the following condition 5 to condition 7 are satisfied.

(Condition 5) The vehicle speed "v" is equal to or higher than a predetermined vehicle speed threshold value vth.

(Condition 6) A stop required period T of the own vehicle V exceeds a reference period Ts.

(Condition 7) The virtual passing period Tx is equal to or longer than the lower limit period Tl and equal to or shorter than the upper limit period Tu (≤Ts).

First, the condition 5 is described. When the precondition is satisfied, the ECU 110 sets the xy coordinate system. After that, the ECU 110 determines whether or not the vehicle speed "v" is equal to or higher than the vehicle speed threshold value vth. The ECU 110 determines that the condition 5 is satisfied when a relationship of "v≥vth" is satisfied, and determines that the condition 5 is not satisfied when a relationship of "v<vth" is satisfied. As the vehicle speed threshold value vth, "the minimum value of the vehicle speed 'v' at which the own vehicle V that has started the right turn completes the crossing without stopping in an intersection or on an opposing lane" is set, and the value of the vehicle speed threshold value with is, for example, 15 km per hour. That is, the condition 5 is a condition which is satisfied when a possibility that the own vehicle V stops in an intersection or on an opposing lane is low. The condition 5 corresponds to an example of "the crossing condition."

The condition 6 is now described. The ECU 110 is configured to determine whether or not the condition 6 is satisfied under the state in which the condition 5 is satisfied. When the condition 5 is satisfied, the ECU 110 uses a well-known method to estimate the stop required period T required for the own vehicle V to stop based on second vehicle information including presence or absence of the operation of the brake pedal (presence or absence of the brake operation) acquired from the brake switch 114, a deceleration (described below), and the vehicle speed "v". The deceleration is a negative acceleration, and may be calculated based on the transition of the vehicle speed "v". The second vehicle information may include, in place of or in addition to the presence or absence of the operation of the brake pedal, presence or absence of the brake operation acquired from another device capable of detecting the brake operation by the driver.

The ECU 110 determines whether or not the stop required period T exceeds the reference period Ts, determines that the condition 6 is satisfied when a relationship of "T>ts" is satisfied, and determines that the condition 6 is not satisfied when a relationship of "T≤Ts" is satisfied. The reference period Ts is set based on a general period required for the driver, during the right turn, to notice the existence of an oncoming vehicle Vop, and to try to stop the own vehicle V, and the value of the reference period Ts is, for example, 4.0 seconds. That is, the condition 6 is also a condition which is satisfied when a possibility that the driver does not recognize the oncoming vehicle Vop is high. The condition 6 corresponds to an example of "the crossing condition," and the reference period Ts corresponds to an example of "a second reference period."

The condition 7 is now described. The ECU 110 is configured to determine whether or not the condition 7 is satisfied under the state in which the condition 6 is satisfied. The condition 7 is the same condition as the condition 4 in the first embodiment. That is, when the condition 6 is satisfied, the ECU 110 calculates the virtual passing period Tx, and determines whether or not the period Tx is equal to or longer than the lower limit period Tl, and equal to or shorter than the upper limit period Tu. The ECU 110 determines that the condition 7 is satisfied when the relationship of "Tl≤Tx≤Tu" is satisfied, and determines that the condition 7 is not satisfied when the relationship of "Tx<Tl" or the relationship of "Tu<tx" is satisfied. As the period Tu and the period Tl, the values based on reasons equivalent to those in the first embodiment are set, and the values thereof are, for example, Tu=3.2 seconds and Tl=1.0 second. That is, the condition 7 is the condition satisfied when a possibility that the own vehicle V collides with the oncoming vehicle Vop in an intersection (that is, before the completion of the crossing of the intersection) when the own vehicle V turns right while maintaining the current longitudinal speed vx is high. The reference period Ts is set to a value that satisfies a relationship of "Tu≤Ts".

When all of the condition 5 to the condition 7 are satisfied, and the second execution condition is consequently satisfied (that is, there exists the possibility that the own vehicle collides with the oncoming vehicle Vop before the own vehicle completes the right turn), the ECU 110 executes the notification control (processing 1 and processing 2).

With this configuration, when the condition 5 is not satisfied, that is, the relationship of "v<vth" is satisfied, the notification control is not executed. When the relationship of "v<vth" is satisfied under the state in which the precondition is satisfied, a possibility that the driver recognizes the oncoming vehicle Vop, to thereby decelerate the own vehicle V is high. Thus, as described above, when the possibility that the driver can recognize the oncoming vehicle Vop is high, the notification control is not executed, thereby being capable of suppressing the unnecessary operation.

Moreover, when the condition 6 is not satisfied, that is, the relationship of "T≤Ts" is satisfied, the notification control is not executed. When the relationship of "T≤Ts" is satisfied in spite of the relationship of "v≥vth" being satisfied under the state in which the precondition is satisfied, a possibility that the driver noticed the existence of the oncoming vehicle Vop in the course of the right turn, and tried to stop the own vehicle V is high. Thus, as described above, when the possibility that the driver can recognize the oncoming vehicle Vop is high, the notification control is not executed, thereby being capable of suppressing the unnecessary operation.

(Specific Operation)

Figure 8:
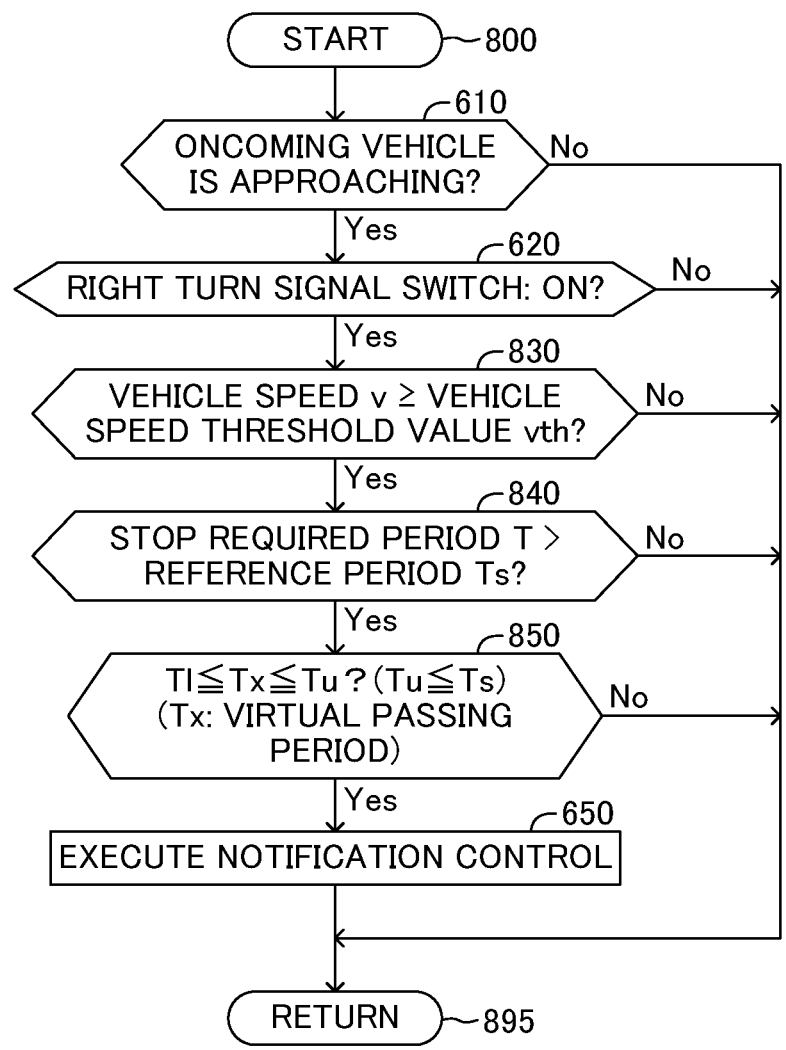
FIG. 8 is a flowchart for illustrating a routine executed by a CPU of a notification control ECU of the apparatus of the second embodiment.

A specific operation of the ECU 110 is now described. The CPU of the ECU 110 is configured to repeatedly execute a routine illustrated as a flowchart of FIG. 8 each time a predetermined calculation period elapses during the period in which the ignition switch is at the ON position. The routine is different from the routine in the first embodiment in a point that processing steps of Step 830 to Step 850 are executed in place of the processing steps of Step 630 and Step 640. Only the processing steps different from those in the first embodiment are now described.

Step 830: The CPU determines whether or not the vehicle speed "v" is equal to or higher than the vehicle speed threshold value with (condition 5). When the relationship of "v<vth" is satisfied, the CPU makes a determination of "No" (that is, determines that the condition 5 is not satisfied (the second execution condition is not satisfied)) in Step 830, and the process proceeds to Step 895. Then, the CPU temporarily finishes the routine. Meanwhile, when the relationship of "v≥vth" is satisfied, the CPU makes a determination of "Yes" (that is, determines that the condition 5 is satisfied) in Step 830, and the process proceeds to Step 840.

Step 840: The CPU determines whether or not the stop required period T exceeds the reference period Ts (condition 6). When the relationship of "T≤Ts" is satisfied, the CPU makes a determination of "No" (that is, determines that the condition 6 is not satisfied (the second execution condition is not satisfied)) in Step 840, and the process proceeds to Step 895. Then, the CPU temporarily finishes the routine. Meanwhile, when the relationship of "T>Ts" is satisfied, the CPU makes a determination of "Yes" (that is, determines that the condition 6 is satisfied) in Step 840, and the process proceeds to Step 850.

Step 850: The CPU determines whether or not the virtual passing period Tx satisfies the relationship of "Tl≤Tx≤Tu" (Tu≤Ts) (condition 7). When the relationship of "Tx<Tl" or the relationship of "Tu<Tx" is satisfied, the CPU makes a determination of "No" (that is, determines that the condition 7 is not satisfied (the second execution condition is not satisfied)) in Step 850, and the process proceeds to Step 895. Then, the CPU temporarily finishes the routine. Meanwhile, when the relationship of "Tl≤Tx=Tu" is satisfied, the CPU makes a determination of "Yes" (that is, determines that the condition 7 is satisfied (the second execution condition is satisfied)) in Step 850, and the process proceeds to Step 650.

Figure 9A:
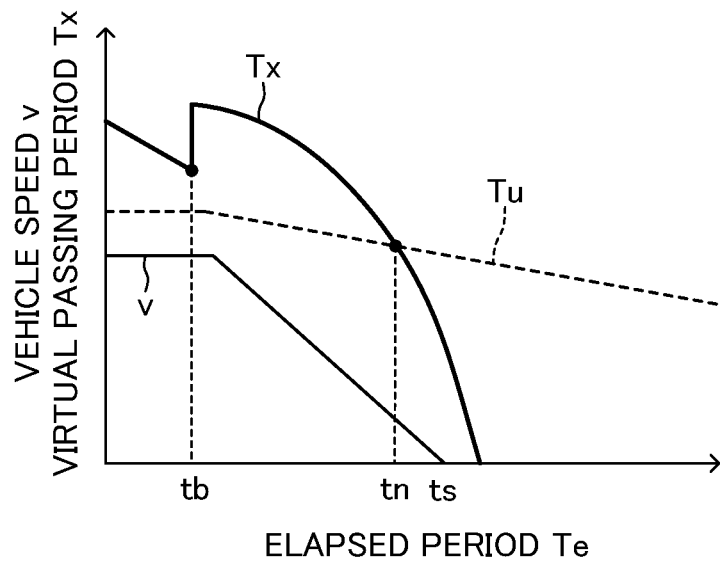
FIG. 9A is a time chart for showing a setting method for an upper limit period Tu at the time when related-art notification control is executed.
Figure 9B:
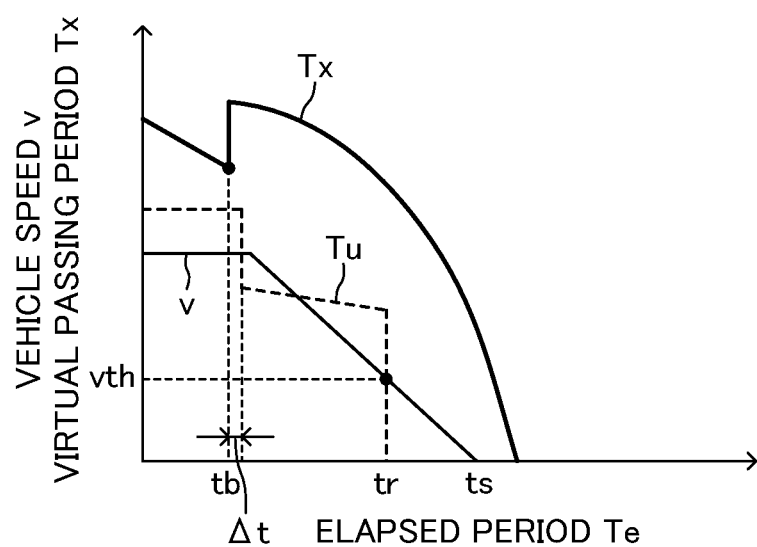
FIG. 9B is a time chart for showing a setting method for the upper limit period Tu at the time when notification control in the second embodiment is executed.

As described above, the apparatus of the second embodiment can provide actions and effects equivalent to those of the apparatus of the first embodiment. FIG. 9A and FIG. 9B are graphs for showing the actions and the effects of the apparatus of the second embodiment. FIG. 9A is a time chart for showing a setting method for the upper limit period Tu when related-art notification control is executed. FIG. 9B is a time chart for showing the setting method for the upper limit period Tu when the notification control in the second embodiment is executed. Horizontal axes of the time charts indicate an elapsed period te after any time point shortly before the driver executes the brake operation. Vertical axes indicate the vehicle speed "v" and the virtual passing period Tx. In any one of the time charts, the notification control is executed when the period Tx becomes equal to or shorter than the upper limit period Tu.

As shown in FIG. 9A and FIG. 9B, the oncoming vehicle Vop approaches the own vehicle V so that "vx+|vop|" is a constant value until the elapsed period te reaches a period tb. Accordingly, the virtual passing period Tx linearly decreases during the period in which a relationship of "te<tb" is satisfied. The driver notices the existence of the oncoming vehicle Vop in the course of the right turn, and starts the brake operation in order to stop the own vehicle V at the time point of te=tb. Accordingly, the vehicle speed "v" decreases at a constant deceleration. Moreover, the longitudinal speed vx consequently decreases, and hence the virtual passing period Tx increases at the time point of te=tb, and the period Tx non linearly decreases (specifically, decreases in a form of a concave-up quadratic function) after that.

In the related art, as shown in FIG. 9A, the upper limit period Tu is designed such that the period Tu moderately decreases during the period in which the brake operation continues. With this configuration, even when the upper limit period Tu is reduced, when the time point (te=tn) at which the relationship of "Tx≤Tu" is satisfied is before the time point (te=ts) at which the own vehicle V stops, the notification control is executed at the time point of te=tn even when the driver has recognized the oncoming vehicle Vop, which causes the unnecessary operation.

In contrast, in the second embodiment, as shown in FIG. 9B, the upper limit period Tu decreases by a predetermined value at a time after a time lag of Δt from the start time point (te=tb) of the brake operation. This is because it is not required to consider a free running period due to the start of the brake operation. After that, the upper limit period Tu moderately decreases during a period in which the brake operation continues. When the vehicle speed "v" becomes lower than the vehicle speed threshold value with at a time point of te=tr, the upper limit period Tu is set to zero. This is because, as described above, when the relationship of "v<vth" is satisfied, the possibility that the own vehicle V stops in an intersection or on an opposing lane is high (that is, the possibility that the driver recognizes the oncoming vehicle Vop is high), and hence necessity for executing the notification control is extremely low. As described above, according to the apparatus of the second embodiment, as a result of the value of the upper limit period Tu being appropriately changed, it is possible to greatly reduce the possibility of the notification control being executed even when the possibility that the driver recognizes the oncoming vehicle Vop is high, and to suppress the unnecessary operation of the notification control.

In the above, the notification control apparatus for a vehicle according to the embodiments has been described, but the present invention is not limited to the above-mentioned embodiments, and various changes are possible within the range not departing from the object of the present invention.

For example, in the above-mentioned embodiments, description is given of the case in which the specific direction is the right direction, but the configuration is not limited to this example. The present invention can also be applied to a case in which the specific direction is the left direction, and a configuration in this case may be described by reading "right" in the above-mentioned embodiments as "left" and reading "left" in the above-mentioned embodiments as "right." Moreover, the present invention can also be applied to a vehicle traveling by autonomous driving (autonomous driving control).

What is claimed is:

1. A notification control apparatus for a vehicle, the notification control apparatus comprising:
    a surrounding information acquisition device configured to acquire, as surrounding information, information on a three dimensional (3D) object that exists forward of an own vehicle, and dividing lines that define a lane that extends forward of the own vehicle;
    a direction indicator switch configured to detect an operation state of an operation unit to be operated by a driver of the own vehicle in order to operate direction indicators;
    a vehicle speed detection device configured to detect a vehicle speed of the own vehicle;
    a driving operation state detection device which includes at least one of a steering input value detection device configured to detect a steering input value being an input value based on a steering operation by the driver or a brake switch configured to detect presence or absence of a brake operation by the driver;
    a notification device configured to execute a notification operation; and
    a control unit configured to control the notification device, wherein the control unit is configured to:
        determine, in a case in which a direction in which an opposing lane is positioned with respect to a travel lane on which the own vehicle exists is defined as a specific direction, based on the surrounding information, whether an oncoming vehicle exists, the oncoming vehicle being another vehicle that moves on the opposing lane toward a direction approaching the own vehicle, and that a virtual extension extending from the another vehicle along a moving direction of the another vehicle is passing on the specific direction side with respect to a current position of the own vehicle;
        determine, when a precondition which is satisfied when it is determined that the oncoming vehicle exists and that the operation unit is in an operation state corresponding to an operation to operate the direction indicator on the specific direction side is satisfied, based on vehicle information including at least one of the steering input value or the presence or absence of the brake operation and the vehicle speed, whether a crossing condition is satisfied, the crossing condition being satisfied when a possibility that the own vehicle completes, after elapse of a predetermined reference period, crossing of one of the opposing lane or an intersection with which the opposing lane merges is high; and
        cause the notification device to execute the notification operation, to thereby execute notification control of notifying the driver of the existence of the oncoming vehicle when an execution condition is satisfied in a case in which a direction opposite to the moving direction of the oncoming vehicle is defined as a longitudinal direction, the execution condition being satisfied when it is determined that the crossing condition is satisfied and that a virtual passing period required for the own vehicle to virtually pass the oncoming vehicle in the longitudinal direction is equal to or longer than a predetermined lower limit period and equal to or shorter than a predetermined upper limit period equal to or shorter than the reference period when it is assumed that the own vehicle moves in the longitudinal direction at a longitudinal speed being a component of the vehicle speed in the longitudinal direction and the oncoming vehicle moves while maintaining a current moving state.

2. The notification control apparatus for a vehicle according to claim 1,
    wherein the driving operation state detection device is the steering input value detection device,
    wherein the vehicle information is first vehicle information including a steering angle, a steering angular velocity, and the vehicle speed, and
    wherein, in a case in which a direction that is orthogonal to the longitudinal direction, and is directed to the specific direction is defined as a lateral direction, the control unit is configured to:
        estimate, based on the first vehicle information, a moving distance of the own vehicle at a time when it is assumed that the own vehicle moves for a first reference period which is included in the reference period;
        calculate a lateral moving distance being a component of the moving distance in the lateral direction; and
        determine that the crossing condition is satisfied when the lateral moving distance is equal to or longer than a predetermined distance threshold value.

3. The notification control apparatus for a vehicle according to claim 2, wherein the distance threshold value is set to a value of an average lane width.

4. The notification control apparatus for a vehicle according to claim 1,
    wherein the driving operation state detection device is the brake switch,
    wherein the vehicle information is second vehicle information including the presence or absence of the brake operation, a deceleration, and the vehicle speed, and
    wherein the control unit is configured to:
        estimate, based on the second vehicle information, a stop required period required for the own vehicle to stop; and
        determine that the crossing condition is satisfied when the vehicle speed is equal to or higher than a predetermined vehicle speed threshold value, and the stop required period exceeds a second reference period which is included in the reference period.

* * * * *